United States Patent [19]
Reeg et al.

[11] Patent Number: 5,837,637
[45] Date of Patent: Nov. 17, 1998

[54] CATALYST REGENERATION

[75] Inventors: Cloyd P. Reeg, Fullerton; Phillip K. Maher, Orange, both of Calif.; David K. Morash, Friday Harbor, Wash.; James J. Prosser, Fawn Grove, Pa.

[73] Assignee: Tricat Industries, Inc., McAlester, Okla.

[21] Appl. No.: 631,907

[22] Filed: Apr. 12, 1996

Related U.S. Application Data

[63] Continuation of Ser. No. 361,866, Dec. 22, 1994, abandoned, which is a continuation of Ser. No. 30,697, Mar. 12, 1993, abandoned.

[51] Int. Cl.$^6$ ............................... B01J 38/30; B01J 20/34
[52] U.S. Cl. ................................. 502/41; 502/43; 208/164
[58] Field of Search ..................... 502/41, 43; 208/164; 422/144

[56] References Cited

U.S. PATENT DOCUMENTS

| | | | |
|---|---|---|---|
| 2,419,245 | 4/1947 | Arveson | 502/43 |
| 2,919,241 | 12/1959 | Kelly et al. | 208/164 |
| 4,026,821 | 5/1977 | Schoofs et al. | 208/112 |
| 4,925,632 | 5/1990 | Thacker et al. | 422/144 |
| 4,956,510 | 9/1990 | Harandi | 208/140 |
| 5,108,968 | 4/1992 | Ellingham | 502/43 |
| 5,346,610 | 9/1994 | Owen et al. | 502/43 |

OTHER PUBLICATIONS

Venuto et al, "Fluid Catalytic Cracking with Zeolite Catalysts", Catalysis Reviews–Science and Engineering, vol. 18, No. 1, 1978, pp. 43–47 No month.

*Primary Examiner*—Glenn Caldarola
*Assistant Examiner*—Alexander G. Ghyka
*Attorney, Agent, or Firm*—Robert J. Baran

[57] ABSTRACT

The present invention provides a process for continuously regenerating a catalyst or an adsorbent which comprises the steps of:

(a) establishing an ebullating or expanded bed by passing a gaseous stream upwardly through a plurality of particles confined in a regeneration zone, (b) providing a looped pathway in said ebullating bed, (c) passing a spent catalyst into said ebullating bed and moving said spent catalyst along said multi-looped pathway, and (d) removing a regenerated catalyst from said ebullating bed.

In the process of this invention, the looped pathway requires substantially all of the particles to traverse a pathway that varies in direction by about 180° from beginning to end of each loop in the pathway. In this process, the particles may be regenerated by lowering the carbon deposited thereon from a range of from about 8 to about 17 wt. % to a range of from about 0.3 to 1.5 wt. %, and the sulfur content of from about 6 to 9 wt. % to a range of from about 0.4 to 1.4 wt. %.

29 Claims, 1 Drawing Sheet

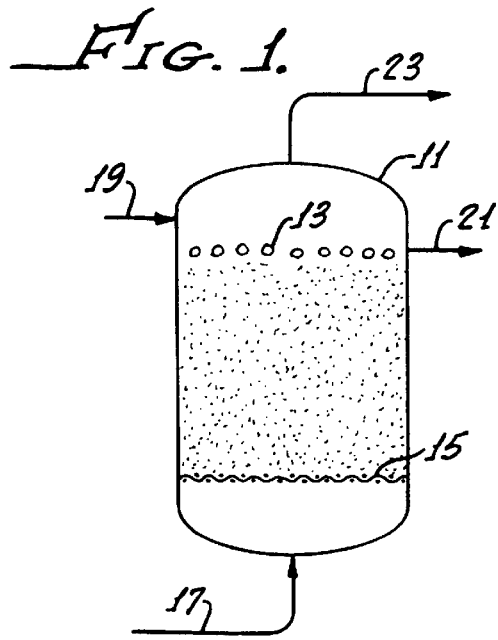
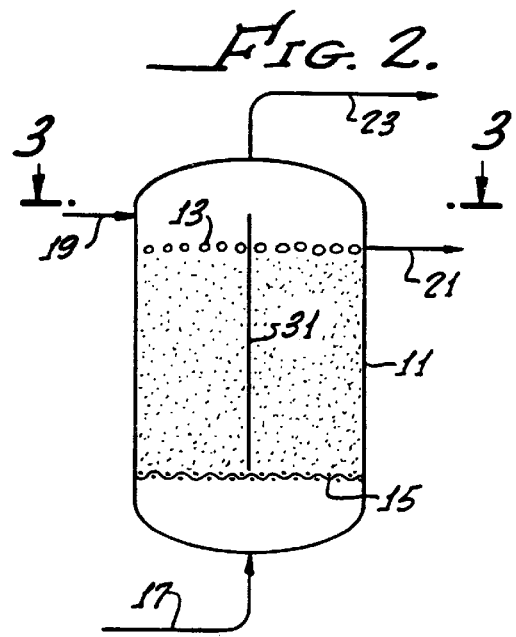
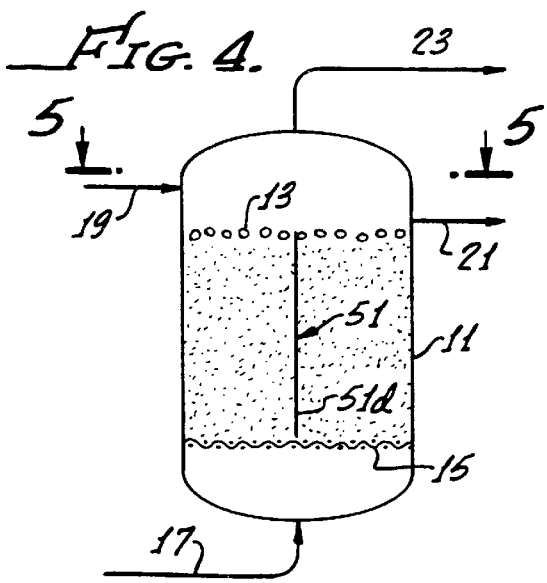
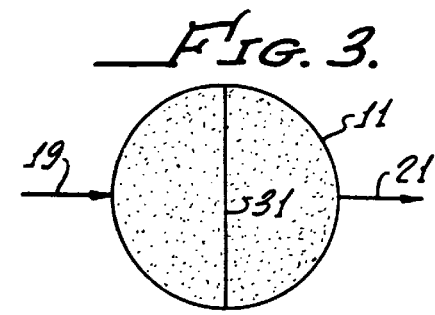
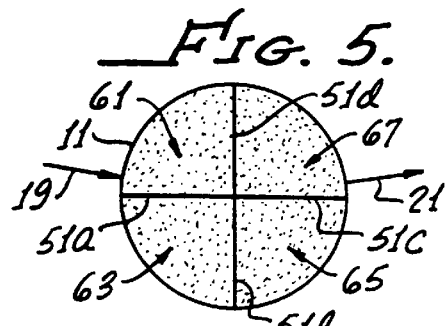
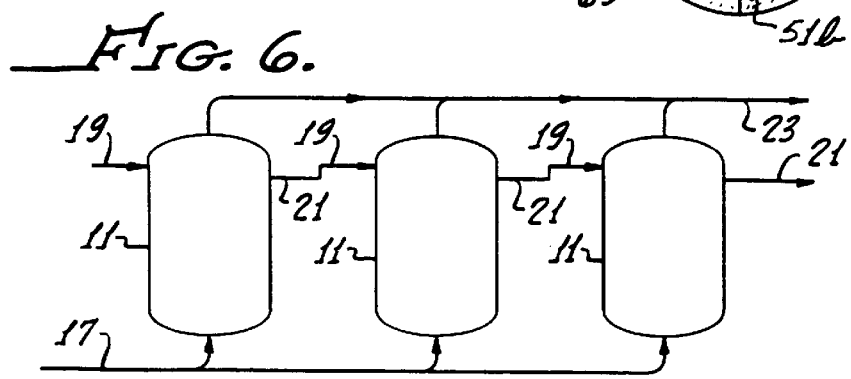

CATALYST REGENERATION

This application is a continuation of application(s) Ser. No. 08/361,866 filed on Dec. 22, 1994, now abandoned, which is a continuation of application(s) Ser. No. 08/030,697 filed on Mar. 12, 1993 now abandoned.

BACKGROUND OF THE INVENTION

1. Field of the Invention

This invention relates to a process of treating catalysts and adsorbents used in the petroleum processing or chemical industry. It specifically relates to a process of suspending such material in a gaseous atmosphere within a vertical chamber to establish an ebullating or expanded bed of spent catalyst particles and passing a gaseous stream through the particles being treated. The process can be used to regenerate spent catalysts and adsorbents by oxidizing sulfur, coke or carbonaceous deposits from them. This process can further be used to remove volatile hydrocarbons as well as entrapped moisture from the spent material.

2. Brief Description of the Art

Catalysts employed in the petroleum or chemical industries may consist of a particulate carrier, e.g. alumina, silica, or zeolite, and catalytic metals. The catalytic metals may be noble and non-noble metals, such as platinum, rhenium, cobalt, molybdenum, nickel, tungsten and palladium, as well as rare earth metals. These catalysts are employed in various hydroprocessing units. For instance, when combined with hydrogen and heat, such catalysts can be used to change the molecular structure of oil, as in hydrocracking. In addition, such catalysts can be employed to remove impurities as in hydrodesulfurization and hydrodenitrification; saturate, with hydrogen, hydrocarbon streams, as in hydrogenation; and dehydrogenate feed streams, as in reforming.

Adsorbents used in the petroleum and chemical industries also consist of alumina, silica, zeolite, as well as other high surface area solid materials. They are generally used for dehydration of and/or the separation of impurities and molecular components within a hydrocarbon or gas stream.

Such exemplified adsorbents, as well as the above catalysts, become deactivated by the build-up of sulfur, coke or polymer deposits on and within the particles. Such build-up continues during operation of the processing unit, seriously impairing the efficiency as well as the selectivity of the process. For economy, as well as environmental reasons, the deactivated catalysts must be re-used. Therefore, it is important that there exist a suitable process for the regeneration of said deactivated catalysts. In the existing processes for the regeneration of the above deactivated catalysts, the deposits are removed to restore activity. Such deposits are normally removed from the catalytic particles by contacting them with oxygen.

Various processes have been developed for regenerating the above catalysts and/or adsorbents. For example, U.S. Pat. No. 5,108,968 to Ellingham et al. discloses a catalyst regeneration process which is carried out by suspending the catalyst particles with an oxygen-containing gaseous feedstream in a vertically extending column and retaining said suspended catalyst particles in said column for a time sufficient to reduce the coke contaminant thereon to about 0.1–0.5 wt. %. In this process, the particles are recovered by terminating the gaseous feedstream and allowing the particles to fall to the bottom of the vertically extending column. The process disclosed in this patent is a batch process and does not achieve the throughput of the process of this invention at similar residence times. Moreover, being a batch process, each batch requires a new trial to optimize operating conditions. Steady state operation is not achievable in the process of this patent.

U.S. Pat. No. 4,026,821 discloses a process for regenerating catalysts which have become inactivated due to accumulation of carbon deposits or sulfur-containing carbon deposits on the catalyst surface during the course of use in catalytically refining various petroleum oils. In this process, the spent catalyst is passed into a slowly rotating elongated generally cylindrical shell having its inlet at a level above its outlet end and having overlapping tangential louvers attached to the interior of the shell to support the catalyst. An oxygen-containing gas is passed into the space between the louvers and through the catalyst supported on the louvers, and catalyst is withdrawn from the space enclosed by the louvers at the outlet end of the shell. In the process of this patent, contacting efficiency is inherently low; therefore, multiple passes are required to achieve satisfactory (i.e., 90% or greater) carbon burn-off. This process thus requires much longer residence times than the process of this invention, thereby resulting in higher particle attrition and catalytic properties detrimentally affected by the longer time at the regeneration temperature. For example, surface area, metal agglomeration, etc. may each be affected adversely.

There are many other recent patents that disclose and claim catalyst regeneration processes, thereby demonstrating a continuing need to provide an efficient process for the regeneration of the above catalysts.

It is therefore an object of the present invention to provide a process for the regeneration of adsorbents and catalysts used in the chemical and/or petroleum processing industries.

It is a further object to provide a process for the regeneration of petroleum-processing catalysts comprising an alumina, silica or zeolitic support and de-activated by the deposition of sulfur and carbon thereon by oxidizing said carbon and sulfur to their respective oxides.

Other objects and advantages of the instant invention will be apparent from a careful reading of the specification below.

BRIEF SUMMARY OF THE INVENTION

The present invention provides a process for continuously regenerating a catalyst or an adsorbent which comprises the steps of:

1. establishing an ebullating or expanded bed by passing a gaseous stream upwardly through a plurality of particles confined in a regeneration zone,
2. providing a looped pathway in said ebullating bed,
3. passing a spent catalyst into said ebullating bed and moving said spent catalyst along said looped pathway, and
4. removing a regenerated catalyst from said ebullating bed.

For the purposes of describing this invention, the terms "ebullating" or "expanded bed" are equivalent and are intended to refer to a stable bed of particles that has a volume that is 20% to 100% greater than the volume of the packed or dense bed. More preferably, the ebullating or expanded bed utilized in the process of the instant invention will have a volume that is at least about 50% greater than the volume of the packed or dense bed.

More preferably, the present invention provides a process for continuously regenerating a spent catalyst or adsorbent which has been deactivated by use in a petroleum conversion process whereby sufficient carbon and sulfur have been deposited on the surface thereof to substantially reduce the catalytic activity which comprises the steps of:

1. establishing an ebullating or expanded bed having a vertical dimension substantially greater than its horizontal dimension by passing an oxygen-containing gaseous stream upwardly through a plurality of particles confined in a regeneration zone maintained at a temperature sufficient to remove said carbon and sulfur from the surface of said catalyst,
2. providing a multi-looped pathway through said ebullating bed, wherein each circuit of each of such loops are oriented along and approximately twice the length of said vertical dimension of said ebullating bed,
3. passing said spent catalyst into said ebullating bed and moving said spent catalyst along said multi-looped pathway for a time sufficient to substantially reduce the carbon and sulfur deposited on the catalyst, and
4. removing a regenerated catalyst from said ebullating bed.

More preferably, the present invention provides a process for continuously regenerating a spent catalyst or adsorbent which has been deactivated by use in a petroleum conversion process whereby sufficient carbon and sulfur have been deposited on the surface thereof to substantially reduce the catalytic activity which comprises the steps of:

1. establishing first and second ebullating or expanded beds each having a vertical dimension substantially greater than its horizontal dimension by passing a gaseous stream upwardly through a plurality of particles and confining said ebullating beds in a first and second regeneration zone, respectively,
2. providing a continuous looped pathway through said ebullating beds, wherein each bed encompasses at least one loop of said continuous multi-looped pathway and wherein the circuit of each of said encompassed loops is oriented along and approximately twice the length of the vertical dimension of the ebullating bed within which it is encompassed,
3. passing said spent catalyst into said first regeneration zone and moving said spent catalyst along said continuous multi-looped pathway,
4. maintaining the temperature of each regeneration zone at a level sufficient to substantially remove carbon and sulfur from the surface of said spent catalyst by oxidizing said deposited carbon and sulfur from the surface of the spent catalyst as it moves through the regeneration zone, and
5. removing a regenerated catalyst from said second regeneration zone.

BRIEF DESCRIPTION OF THE DRAWINGS

The invention will be more readily understood by reference to the drawings wherein like numerals refer to like elements and in which:

FIG. 1 is a longitudinal cross-sectional view of an apparatus for regenerating a deactivated catalyst or adsorbent in an expanded bed of deactivated catalyst particles by passing a regeneration gas upwardly through said expanded bed at conditions sufficient to convert carbon and sulfur deposits on said deactivated catalyst particles into their respective oxides and removing said oxides overhead;

FIG. 2 is a longitudinal cross-sectional view of a regeneration apparatus useful in the process of the invention and similar to the apparatus described in FIG. 1, except that a baffle is provided in said apparatus to divide the bed into separate zones, the volume of each said separate zone being approximately one-half of the volume of the bed of FIG. 1;

FIG. 3 is a transverse cross-sectional view of the apparatus of FIG. 2 taken along line A—A, showing the orientation of the baffle;

FIG. 4 is a longitudinal cross-sectional view of another regeneration apparatus useful in the process of this invention and having a baffle arrangement to divide the bed into 4 separate zones, each said separate zone being approximately one-fourth the volume of the bed of FIG. 1;

FIG. 5 is a transverse cross-sectional view taken along line A—A of FIG. 5 and showing the orientation of the baffle arrangement; and FIG. 6 is a schematic diagram illustrating an arrangement of three sequential regeneration apparatuses according to FIG. 2.

DETAILED DESCRIPTION OF THE DRAWINGS

A preferred embodiment of the process of this invention utilizes an expanded bed of spent hydroprocessing or reforming catalyst stabilized with air or other gas containing oxygen in the range of from about 1% to about 21%, by volume, and more preferably from about 10% to about 18%, by volume, to effect the removal of carbonaceous materials and sulfurous materials from used or spent catalysts. (A volume of oxygen in excess of 21% may be desirable in certain applications where cost is not a consideration.) Typical catalyst particle sizes may range from $\frac{1}{32}$" to $\frac{1}{8}$" diameter but are not limited thereto.

As shown in FIG. 1, a vertical column 11 confines a bed of deactivated catalyst particles 13. A distributor grid 15 serves to support the particles and distribute a gas passing therethrough from below. Air is introduced below the catalyst bed through inlet 17 and distributor grid 15 to provide mild expansion of the bed. Minimum threshold fluidizing velocities and air volumes are utilized to prevent unnecessary attrition and to maintain minimum particle-to-particle contacting in the expanded bed. Spent catalysts with 5 to 30 weight percent carbon and 2 to 10 percent sulfur typically are introduced into the top of the expanded bed through inlet 19. After contacting with air, which provides the process heat required from the combustion of carbon and sulfur to the gaseous oxides $CO_2$ and $SO_2$, the catalyst flow through the reaction system like a fluid and is removed through outlet 21. Exhaust gases pass overhead through outlet 23 to an optional bag house (not shown) to remove particles as required to keep dust under control.

The exhaust gas is then scrubbed with caustic in a scrubber unit (not shown) to remove sulfur oxides from the gas stream and allow it to be discharged harmlessly. In the regeneration apparatus of FIG. 1, as originally tested, it was difficult to produce satisfactory low carbon and low sulfur products from a deactivated catalyst having from about 7 to 15 wt. % carbon and 3 to 7 wt. % sulfur deposited thereon under a wide range of operating conditions, i.e., temperatures up to 1200° F. beyond which damage to the catalyst support (alumina or silica-alumina or zeolite) could occur, contact or residence times covering several hours and providing only marginal improvement. (See Examples 1 and 2 below.)

While not wishing to be bound by theory, it is believed that bypassing was occurring in the reactor from feed inlet 19 to product outlet 21. This bypassing was sufficient to maintain high carbon and sulfur levels in the product (~typically 2.8% carbon and ~1.6% sulfur). Thus, a baffle may be installed in the regeneration apparatus of FIG. 1, to separate the two divided flow areas into a downflow zone 41 on the left and an upflow zone 43 on the right. See FIGS. 2 and 3 wherein baffle 31 is shown as oriented upwardly and extending approximately the height of the particle bed and dividing the bed into two equal volumes. The baffle 31 and the interior walls of vertical column 11 define a tortuous or looped path for the catalyst particles. (For the purpose of this invention, a tortuous or looped path is one requiring at least one change in direction of about 180° from the beginning to the end thereof. Of course, the pathway may be multi-looped, i.e., in a pathway with two loops, the change in direction is 540°.) The catalyst stream passes under the baffle opening shown at the bottom and flows continuously like a liquid. In this way, substantially all of the catalyst has a tortuous or looped path to reach the outlet, while moving through the same total reactor volume prior to leaving the regenerator. That is, substantially none of the catalyst particles may pass along a path from the inlet 19 to the outlet 21 without at least one change in direction of 180° therebetween. Product carbon and sulfur values are further reduced as a function of this change, typically ~0.9% carbon and ~1.4% sulfur. Still, it is preferred to obtain a regenerated product of 0.5% carbon and sulfur.

A deactivated catalyst may be processed in the regeneration apparatus, shown in FIGS. 4 and 5. In this apparatus, an X-shaped member 51 is oriented along the catalyst particle bed to provide 4 baffles and divide the bed into four separate zones of approximately equal volume. Unregenerated catalyst enters at the top of zone 61, defined by baffles 51a and 51d and the interior wall of vertical cylinder 11. That catalyst flows downward under the baffle 51a at the bottom of zone 63. The catalyst flows upward in zone 63 and over the top of baffle 51b separating zones 63 and 65. This baffle 51b is reduced in height to allow overflow into zone 65. Down flow of catalyst occurs in zone 65, under baffle 51c between zones 65 and 67 and upward through zone 67. From zone 67, the regenerated catalyst flows out the top nozzle 21 to production. Flue gases are collected from the top of each zone, combined, sent to a bag house (not shown) and then to caustic scrubbing (not shown).

The four-baffle system of the apparatus of FIGS. 4 and 5 further increases tortuosity, lengthening of the flow path, and increased control time with simultaneous expanded bed mixing. Product carbon and sulfur values of 0.33% carbon and 0.29% sulfur may be obtained in this arrangement which is acceptable to the refining industry.

The system shown in FIG. 6 provides increased flexibility for processing both smaller and larger sized catalysts. Two or more (preferably three or more) reactors are used in series to provide required tortuosity together with minimum residence time. Each reactor has a center baffle dividing the cross-sectional area into equal sectors or an X-shaped baffle to divide the bed into four equal volumes, as shown in FIGS. 3 and 4 and FIGS. 5 and 6, respectively.

Air may be manifolded to the individual reactors to handle smaller, i.e., 1/16 inch catalyst. For larger size, or 1/8 inch catalyst, more of the air can be directed to the first reactor to effect required bed expansion. In all of these systems, bed expansion is the minimum expansion, minimum gas or air rate as required, for a stable (expanded) bed volume of approximately 50% to 100% greater than the corresponding dense bed volume. Fluidization or expansion of the beds in excess of this is a result of higher gas and such higher rates substantially increase scrubbing requirements. Increased attrition and carryover of entrained particles of catalyst also may result.

The invention is further illustrated by the following examples which are illustrative of various aspects of the invention and are not intended as limiting the scope of the invention as defined by the appended claims.

EXAMPLES 1–3

The expanded bed continuous regeneration was carried out in a test unit in a manner that resulted in considerable product short-circuiting with the resulting failure to decrease carbon and sulfur sufficiently. Examples 1 and 2 were carried out in the reactor with a single chamber configuration, as described in FIG. 1. Example 2 shows the effect of higher temperature. Example 3 shows the effect of decreased short circuiting resulting from carrying out the regeneration of the deactivated catalyst in the apparatus described in FIGS. 2 and 3. Other than the baffle arrangement, the apparatus utilized in Examples 1, 2 and 3 were the same. Surprisingly, the carbon content was reduced to 1.5 wt. % and the sulfur content was reduced to 0.7 wt. % when the regeneration is carried out in the apparatus of FIGS. 2 and 3. With the apparatus of FIG. 1, 2.8 wt. % carbon and 1.7 wt. % sulfur were the lowest levels achieved.

|  | Example 1 | Example 2 | Example 3 |
|---|---|---|---|
| Catalyst Type | A[1] | A[1] | B[2] |
| Unregenerated Catalyst: |  |  |  |
| Wt. % of Carbon | 14.1 | 14.1 | 12 |
| Wt. % of Sulfur | 6.2 | 6.2 | 5 |
| Inlet Air Temp. °C. | 400 | 400 | 400 |
| Catalyst Bed Temp. °C. | 525 | 585 | 620 |
| Catalyst Extended Bed Depth (inches) | 9 | 9 | 12 |
| Avg. Retention Time (min.) | 20 | 20 | 30 |
| Bed Content (lbs.) | 18 | 18 | 24 |
| Unregenerated Catalyst Feed Rate (#/min.) | 0.9 | 0.9 | 0.6 |
| Regenerated Catalyst: |  |  |  |
| Wt. % of Carbon | 4.3 | 2.8 | 1.5 |
| Wt. % of Sulfur | 2.3 | 1.7 | 0.7 |
| $N_2$ Surface Area | 169 | 170 | 260 |

[1] A is cobalt/molybdenum supported on alumina.
[2] B is nickel/molybdenum supported on alumina/zeolite.

EXAMPLES 4–6

In these examples, the expanded bed continuous regeneration process of this invention was carried out in a test reactor divided into four chambers, i.e., the apparatus of FIGS. 4 and 5, to decrease bypassing further. The best bypass elimination was achieved in Example 6, but Example 4 was excellent, considering the high inlet carbon content of the catalyst tested.

|  | Example 4 | Example 5 | Example 6 |
|---|---|---|---|
| Catalyst Type | C[3] | D[4] | D[4] |
| Unregenerated Catalyst: |  |  |  |
| Wt. % of Carbon | 17.2 | 8.1 | 8.1 |
| Wt. % of Sulfur | 6.2 | 8.9 | 8.9 |
| Inlet Air Temp. °C. | 400 | 400 | 600 |
| Catalyst Bed Temp. °C. | 630 | 620 | 625 |
| Catalyst Extended Bed Depth (inches) | 12 | 12 | 24 |
| Avg. Retention Time (min.) | 40 | 40 | 80 |
| Bed Content (lbs.) | 24 | 24 | 48 |

-continued

|  | Example 4 | Example 5 | Example 6 |
|---|---|---|---|
| Unregenerated Catalyst Feed Rate (#/min.) | 0.45 | 0.45 | 0.45 |
| Regenerated Catalyst: |  |  |  |
| Wt. % of Carbon | 1.54 | 0.9 | 0.33 |
| Wt. % of Sulfur | 1.05 | 1.4 | 0.47 |
| $N_2$ Surface Area | 208 | 145 | 142 |

[3]C is cobalt/molybdenum supported on alumina.
[4]D is nickel/molybdenum supported on alumina.

Again, it was surprisingly found-that the carbon content can be reduced to a range from 0.33 to 1.54 wt. % and the sulfur content can be reduced to from 0.47 to 1.4 wt. %, while regenerating a deactivated catalyst varying in carbon content of from 8.1 to 17.2 wt. % and sulfur content of from 6.2 to 8.9 wt. %.

While particular embodiments of the invention have been described, it will be understood of course that the present invention is not limited thereto since many obvious modifications can be made; and it is intended to include within this invention any such modifications as will fall within the scope of the appended claims.

Having now described the invention, what is claimed is:

1. A process for continuously regenerating a spent catalyst or an adsorbent which comprises the steps of:
   (a) establishing at least one ebullating or expanded bed by passing a gaseous stream upwardly through a plurality of particles having a size ranging from 1/16" to 1/8" diameter confined in a regeneration zone,
   (b) establishing at least one downflow zone and at least one upflow zone wherein each downflow zone is in fluid communication with a downstream upflow zone within each bed and maintaining the height of the particles in each upflow zone at the same height as the height of the particles in the adjacent upstream downflow zone to provide a looped pathway in said ebullating bed,
   (c) passing a spent catalyst into said ebullating bed and moving said spent catalyst along said looped pathway, and
   (d) removing a regenerated catalyst from said ebullating bed.

2. The process of claim 1 wherein said pathway changes in direction at least about 540° from the beginning to the end.

3. The process of claim 1 further comprising passing an oxygen-containing gas through said bed to thereby provide a bed volume that is about 20 to 100% greater than the volume of the packed bed.

4. The process of claim 3 wherein said spent catalyst comprises from about 5 to 30% by weight carbon and from 2 to 10% by weight sulfur.

5. The process of claim 4 wherein said spent catalyst is contacted with said oxygen-containing gas at a temperature sufficient to oxidize said carbon and sulfur but not greater than about 1200° F.

6. The process of claim 5 wherein said spent catalyst has been deactivated in the hydroprocessing of hydrocarbon feeds.

7. The process of claim 6 wherein said catalyst comprises one or more catalytic metals selected from the group consisting of platinum, rhenium, cobalt, molybdenum, nickel, tungsten, palladium and rare-earth metals.

8. The process of claim 7 wherein said oxygen-containing gas is air.

9. The process of claim 8 wherein said catalyst comprises nickel/molybdenum/or cobalt/molybdenum supported on alumina or alumina/zeolite.

10. A process for continuously regenerating a spent catalyst which has been deactivated by use in a petroleum conversion process whereby sufficient carbon and sulfur have been deposited on the surface thereof to substantially reduce the catalytic activity which comprises the steps of:
    (a) establishing at least one ebullating or expanded bed each said bed having a vertical dimension substantially greater than its horizontal dimension by passing a gaseous stream upwardly through a plurality of particles having a size ranging from 1/16" to 1/8" diameter confined in a regeneration zone maintained at a temperature sufficient to remove said carbon and sulfur from the surface of said catalyst,
    (b) establishing at least one downflow zone and upflow zone wherein each downflow zone is in fluid communication with a downstream upflow zone within each bed and maintaining the height of the particles in said upflow zone at the same height as the height of the particles in the adjacent upstream downflow zone to provide a looped pathway through each said ebullating bed, wherein each circuit of each of said loops are oriented along and approximately twice the length of said vertical dimension of said ebullating bed,
    (c) passing said spent catalyst into said ebullating bed and moving said spent catalyst along said multi-looped pathway for a time sufficient to substantially reduce the carbon and sulfur deposited on the catalyst, and
    (d) removing a regenerated catalyst from said ebullating bed.

11. The process of claim 10 further comprising establishing at least two ebullating beds and wherein said pathway changes in direction at least about 540° from the beginning to the end.

12. The process of claim 10 further comprising passing an oxygen-containing gas through said bed to thereby provide a bed volume that is about 20 to 100% greater than the volume of the packed bed.

13. The process of claim 12 wherein said spent catalyst comprises from about 5 to 30% by weight carbon and from 2 to 10% by weight sulfur.

14. The process of claim 13 wherein said spent catalyst is contacted with said oxygen-containing gas at a temperature sufficient to oxidize said carbon and sulfur but not greater than about 1200° F.

15. The process of claim 14 wherein said spent catalyst has been deactivated in the hydroprocessing of hydrocarbon feeds.

16. The process of claim 15 wherein said catalyst comprises one or more catalytic metals selected from the group consisting of platinum, rhenium, cobalt, molybdenum, nickel, tungsten, palladium and rare-earth metals.

17. The process of claim 16 wherein said oxygen-containing gas is air.

18. The process of claim 17 wherein said catalyst comprises nickel/molybdenum/or cobalt/molybdenum supported on alumina or alumina/zeolite.

19. The process of claim 10 wherein said pathway is defined by an X-shaped member oriented along the vertical dimension of said expanded bed to provide four baffles and divide the bed into four separate zones of approximately equal volume with said zones being in continuous fluid communication between an inlet to said bed and an outlet to said bed.

20. A process for continuously regenerating a spent catalyst which has been deactivated by use in a petroleum conversion process whereby sufficient carbon and sulfur have been deposited on the surface thereof to substantially reduce the catalystic activity which comprises the steps of:
(a) establishing first and second ebullating beds each having a vertical dimension substantially greater than its horizontal dimension by passing a gaseous stream upwardly through a plurality of particles having a size ranging from 1/16" to 1/8" diameter and confirm said ebullating beds in a first and second regeneration zone, respectively,
(b) establishing at least one downflow zone and upflow zone wherein each downflow zone is in fluid communication with a downstream upflow zone within each bed and maintaining the height of the particles in said upflow zone at the same height as the height of the particles in the adjacent upstream downflow zone to provide a continuous looped pathway through said ebullating beds, wherein each bed encompasses at least one loop of a continuous multi-looped pathway and wherein the circuit of each of said encompassed loops is oriented along and approximately twice the length of the vertical dimension of the ebullating bed within which it is encompassed,
(c) passing said spent catalyst into said first regeneration zone and moving said spent catalyst along said continuous multi-looped pathway,
(d) maintaining the temperature of each regeneration zone at a level sufficient to substantially remove carbon and sulfur from the surface of said spent catalyst by oxidizing said deposited carbon and sulfur from the surface of the spent catalyst as it moves through the regeneration zone, and
(e) removing a regenerated catalyst from said second regeneration zone.

21. The process of claim 20 further comprising establishing at least two ebullating beds and wherein said pathway changes in direction at least about 540° from the beginning to the end.

22. The process of claim 20 further comprising passing an oxygen-containing gas through said bed to thereby provide a bed volume that is about 20 to 100% greater than the volume of the packed bed.

23. The process of claim 22 wherein said spent catalyst comprises from about 5 to 30% by weight carbon and from 2 to 10% by weight sulfur.

24. The process of claim 23 wherein said spent catalyst is contacted with said oxygen-containing gas at a temperature sufficient to oxidize said carbon and sulfur but not greater than about 1200° F.

25. The process of claim 24 wherein said spent catalyst has been deactivated in the hydroprocessing of hydrocarbon feeds.

26. The process of claim 25 wherein said catalyst comprises one or more catalytic metals selected from the group consisting of platinum, rhenium, cobalt, molybdenum, nickel, tungsten, palladium and rare-earth metals.

27. The process of claim 26 wherein said oxygen-containing gas is air.

28. The process of claim 27 wherein said catalyst comprises nickel/molybdenum/or cobalt/molybdenum supported on alumina or alumina/zeolite.

29. The process of claim 25 wherein said pathway is defined by an X-shaped member in each of said first and second ebullating beds oriented along the vertical dimension of said expanded bed to provide four baffles and divide the bed into four separate zones of approximately equal volume with said zones being in continuous fluid communication between an inlet to said bed and an outlet to said bed.

* * * * *